US011334028B2

United States Patent
Charbon

(10) Patent No.: US 11,334,028 B2
(45) Date of Patent: May 17, 2022

(54) METHOD FOR MANUFACTURING A BALANCE SPRING FOR A HOROLOGICAL MOVEMENT

(71) Applicant: Nivarox-FAR S.A., Le Locle (CH)

(72) Inventor: Christian Charbon, Chezard-St-Martin (CH)

(73) Assignee: Nivarox-FAR S.A., Le Locle (CH)

( * ) Notice: Subject to any disclaimer, the term of this patent is extended or adjusted under 35 U.S.C. 154(b) by 131 days.

(21) Appl. No.: 16/831,894

(22) Filed: Mar. 27, 2020

(65) Prior Publication Data

US 2020/0356056 A1    Nov. 12, 2020

(30) Foreign Application Priority Data

May 7, 2019 (EP) .................................... 19173113

(51) Int. Cl.
*G04B 17/06* (2006.01)
*G04D 3/00* (2006.01)
*G04B 17/22* (2006.01)

(52) U.S. Cl.
CPC ......... *G04B 17/066* (2013.01); *G04D 3/0041* (2013.01); *G04B 17/22* (2013.01)

(58) Field of Classification Search
CPC ...... G04B 17/066; G04B 17/22; G04B 17/06; G04D 3/0041; C22F 1/008; C22F 1/18; B32B 15/018; B32B 15/01; C22C 19/03; C22C 9/00; C22C 27/02; C22C 5/02; C22C 5/06
See application file for complete search history.

(56) References Cited

U.S. PATENT DOCUMENTS

| 5,881,026 | A | 3/1999 | Baur et al. |
| 2018/0373202 | A1 | 12/2018 | Charbon |

FOREIGN PATENT DOCUMENTS

| CN | 1206861 A | 2/1999 |
| CN | 109116712 A | 1/2019 |
| EP | 0 886 195 A1 | 12/1998 |
| JP | 11-71625 A | 3/1999 |
| JP | 2019-7955 A | 1/2019 |
| WO | WO 2015/189278 A2 | 12/2015 |

OTHER PUBLICATIONS

European Search Report dated Oct. 24, 2019 in European Application 19173117.2 filed May 7, 2019 (with English Translation of Categories of Cited Documents), cited documents AA and AO-AP therein, 4 pages.
Japanese Office Action dated Jan. 18, 2021 in Japanese Patent Application No. 2020-068866 (with English translation), citing documents AO and AP therein, 14 pages.
Combined Chinese Office Action and Search Report dated Mar. 31, 2021 in Chinese Patent Application No. 202010371763.2 (with English translation), citing documents AO and AP therein, 12 pages.

*Primary Examiner* — Moshe Wilensky
(74) *Attorney, Agent, or Firm* — Oblon, McClelland, Maier & Neustadt, L.L.P.

(57) ABSTRACT

A method for manufacturing a balance spring intended to equip a balance of a horological movement, including a step of producing a blank made of a Nb—Zr alloy including between 10 and 30 wt % Zr, a step of annealing and cooling the blank, at least one step of deforming the annealed blank in order to form a wire, wherein, before the deformation step, a step of depositing, on the blank, a layer of a ductile material chosen from copper, nickel, cupronickel, cupromanganese, gold, silver, nickel-phosphorus Ni—P and nickel-boron Ni—B, in order to facilitate the wire shaping operation, the thickness of the ductile material layer deposited being chosen such that the ratio of the area of ductile material to the area of the alloy for a given wire cross-section is less than 1, preferably less than 0.5, and more preferably lies in the range 0.01 to 0.4.

8 Claims, No Drawings

METHOD FOR MANUFACTURING A BALANCE SPRING FOR A HOROLOGICAL MOVEMENT

CROSS-REFERENCE TO RELATED APPLICATION

This application claims priority to European Patent Application No. 19173113.2 filed on May 7, 2019, the entire disclosure of which is hereby incorporated herein by reference.

FIELD OF THE INVENTION

The invention relates to a method for manufacturing a balance spring intended to equip a balance of a horological movement.

BACKGROUND OF THE INVENTION

The manufacture of balance springs for horology is subject to restrictions that often appear irreconcilable at first sight:
- the need to obtain a high yield strength,
- an ease of manufacture, particularly of wire drawing and rolling operations,
- an excellent fatigue strength,
- stability of performance levels over time,
- small cross-sections.

The production of balance springs is furthermore focused on concern for temperature compensation, in order to guarantee consistent chronometric performance levels. This requires obtaining a thermoelastic coefficient that is close to zero. Balance springs with limited sensitivity to magnetic fields are also sought.

Balance springs have been developed using niobium and zirconium alloys. However, these alloys pose problems involving sticking and seizing in the drawing or wire drawing drawplates (diamond or hard metal) and against the rolling rollers (hard metal or steel), which makes it virtually impossible to transform them into fine wires using the standard methods used for steel for example.

SUMMARY OF THE INVENTION

One purpose of the present invention is to propose a method for manufacturing a balance spring intended to equip a balance of a horological movement that facilitates deformations, and more particularly makes for easy rolling operations.

To this end, the invention relates to a method for manufacturing a balance spring intended to equip a balance of a horological movement, comprising:
- a step of producing a blank made of a niobium and zirconium alloy containing:
  - niobium: the remainder to 100 wt %,
  - zirconium: between 10 and 30 wt %,
  - impurities, the total percentage whereof lies in the range 0 to 0.5 wt %.
- a step of annealing and cooling said blank followed by a step of deforming the annealed blank to form a wire, which annealing and deformation steps can be repeated several times,
- a winding step for forming the balance spring,
- a final heat treatment step.

According to the invention, the method comprises, before the deformation step and after the annealing and cooling step, a step of depositing, on the blank, a layer of a ductile material chosen from the group consisting of copper, nickel, cupronickel, cupro-manganese, gold, silver, nickel-phosphorus Ni—P and nickel-boron Ni—B, in order to facilitate the wire shaping operation. The thickness of the ductile material layer deposited is chosen such that the ratio of the area of ductile material to the area of the NbZr alloy for a given wire cross-section is less than 1, preferably less than 0.5, and more preferably lies in the range 0.01 to 0.4. Only a ratio of the surface area of the ductile material/surface are of the NbZr alloy selected from these ranges allows the ductile material/NbZr composite to be easily rolled. The thickness of the ductile material is optimised such that the point, created by filing or by hot drawing, required for the insertion of the wire into the drawplate during drawing or wire drawing operations, is coated in the ductile material. The layer must be thin. More specifically, a thick layer causes clogging issues in the drawplate. Moreover, with a thick layer of ductile material, the shape of the core of the wire becomes difficult to control, with a shape that deviates from that of a circle.

DESCRIPTION OF THE INVENTION

The invention relates to a method for manufacturing a balance spring intended to equip a balance of a horological movement and made of an alloy containing niobium and zirconium.

The method comprises the following steps:
- a step of producing a blank made of a niobium and zirconium alloy containing:
  - niobium: the remainder to 100 wt %,
  - zirconium: between 10 and 30 wt %,
  - impurities, the total percentage whereof lies in the range 0 to 0.5 wt %. More specifically, the impurities can be traces of elements selected from the group consisting of O, H, C, Fe, N, Ni, Si, Cu, Al, Cr, Mn, V, Sn, Mg, Mo, Pb, Co and B, each of said elements being present in a quantity that lies in the range 0 to 1,000 ppm by weight,
- a step of annealing said blank, followed by cooling said blank,
- a step of depositing a ductile material on the blank,
- at least one step of deforming the blank to form a wire, with an annealing and cooling step between the deformation steps in the case of a plurality of deformation steps,
- a winding step for forming the balance spring,
- a final heat treatment step allowing the shape of the balance spring to be fixed and the thermoelastic coefficient to be adjusted.

Preferentially, the NbZr alloy blank used in the present invention does not comprise any other elements except any potential and unavoidable traces. This allows the formation of brittle phases to be prevented.

More particularly, the oxygen content is preferably less than or equal to 0.10 wt % of the total composition, in particular less than or equal to 0.05 wt % of the total composition, or even less than or equal to 0.03 wt % of the total composition.

More particularly, the carbon content is preferably less than or equal to 0.04 wt % of the total composition, in particular less than or equal to 0.02 wt % of the total composition, or even less than or equal to 0.015 wt % of the total composition.

More particularly, the iron content is preferably less than or equal to 0.05 wt % of the total composition, in particular less than or equal to 0.02 wt % of the total composition, or even less than or equal to 0.005 wt % of the total composition.

More particularly, the nitrogen content is preferably less than or equal to 0.04 wt % of the total composition, in particular less than or equal to 0.02 wt % of the total composition, or even less than or equal to 0.015 wt % of the total composition.

More particularly, the hydrogen content is preferably less than or equal to 0.01 wt % of the total composition, in particular less than or equal to 0.0035 wt % of the total composition, or even less than or equal to 0.001 wt % of the total composition.

More particularly, the silicon content is preferably less than or equal to 0.05 wt % of the total composition, in particular less than or equal to 0.02 wt % of the total composition, or even less than or equal to 0.005 wt % of the total composition.

More particularly, the nickel content is preferably less than or equal to 0.05 wt % of the total composition, in particular less than or equal to 0.01 wt % of the total composition, or even less than or equal to 0.002 wt % of the total composition.

More particularly, the content of an element in a ductile solid solution, such as copper, in the alloy, is less than or equal to 0.05 wt % of the total composition, in particular less than or equal to 0.01 wt % of the total composition, or even less than or equal to 0.004 wt % of the total composition.

More particularly, the aluminium content is less than or equal to 0.05 wt % of the total composition, in particular less than or equal to 0.01 wt % of the total composition, or even less than or equal to 0.002 wt % of the total composition.

More particularly, the chromium content is less than or equal to 0.05 wt % of the total composition, in particular less than or equal to 0.01 wt % of the total composition, or even less than or equal to 0.002 wt % of the total composition.

More particularly, the manganese content is less than or equal to 0.05 wt % of the total composition, in particular less than or equal to 0.01 wt % of the total composition, or even less than or equal to 0.002 wt % of the total composition.

More particularly, the vanadium content is less than or equal to 0.05 wt % of the total composition, in particular less than or equal to 0.01 wt % of the total composition, or even less than or equal to 0.002 wt % of the total composition.

More particularly, the tin content is less than or equal to 0.01 wt % of the total composition, in particular less than or equal to 0.0035 wt % of the total composition, or even less than or equal to 0.001 wt % of the total composition.

More particularly, the magnesium content is less than or equal to 0.05 wt % of the total composition, in particular less than or equal to 0.01 wt % of the total composition, or even less than or equal to 0.002 wt % of the total composition.

More particularly, the molybdenum content is less than or equal to 0.05 wt % of the total composition, in particular less than or equal to 0.01 wt % of the total composition, or even less than or equal to 0.002 wt % of the total composition.

More particularly, the lead content is less than or equal to 0.05 wt % of the total composition, in particular less than or equal to 0.01 wt % of the total composition, or even less than or equal to 0.002 wt % of the total composition.

More particularly, the cobalt content is less than or equal to 0.01 wt % of the total composition, in particular less than or equal to 0.0035 wt % of the total composition, or even less than or equal to 0.001 wt % of the total composition.

More particularly, the boron content is less than or equal to 0.005 wt % of the total composition, in particular less than or equal to 0.0001 wt % of the total composition.

The annealing step is a dissolving treatment, with a duration that preferably lies in the range 5 minutes to 2 hours at a temperature that lies in the range 700° C. to 1,500° C., in a vacuum, followed by quenching in a gas or by natural cooling in a vacuum, to obtain a supersaturated solid solution of Zr in β-phase Nb.

The deposition step that more particularly forms the object of the invention consists of depositing a layer of a ductile material chosen from the group consisting of copper, nickel, cupronickel, cupro-manganese, gold, silver, nickel-phosphorus Ni—P and nickel-boron Ni—B, in order to facilitate the wire shaping operation. The thickness of the ductile material layer deposited is chosen such that the ratio of the area of ductile material to the area of the NbZr alloy for a given wire cross-section is less than 1, preferably less than 0.5, and more preferably lies in the range 0.01 to 0.4. By way of example, for a total wire diameter of 0.1 mm, the layer of ductile material can have a thickness of 7 μm for a cross-section of NbZr alloy of 0.086 mm in diameter. This corresponds to a ratio of the area of ductile material (0.002 mm$^2$) to the area of NbZr (0.0058 mm$^2$) of 0.35.

The ductile material, preferably copper, is thus deposited at a given time to facilitate the wire shaping operation by drawing, wire drawing and rolling, so that a thickness remains that preferably lies in the range 1 to 500 micrometres on the wire, which has a total diameter of 0.2 to 1 millimetre.

The addition of ductile material can be galvanic, by PVD or CVD, or mechanical; in this case it is a sleeve or a tube of ductile material such as copper, which is adjusted on a NbZr alloy bar with a large diameter, which is then thinned out during the one or more steps of deforming the composite bar. Thus, one possibility involves forming a composite billet by assembling a Nb—Zr bar and a copper sleeve which then undergoes hot extrusion.

The deformation step as a whole denotes one or more deformation treatments, which can comprise wire drawing and/or rolling. Wire drawing can require the use of one or more drawplates in the same deformation step or in different deformation steps if necessary. Wire drawing is carried out until a wire having a round cross-section is obtained. Rolling can be carried out during the same deformation step as wire drawing, or in another subsequent deformation step. Advantageously, the last deformation treatment applied to the alloy is a rolling operation, preferably having a rectangular profile that is compatible with the inlet cross-section for a winder spindle.

The method can include one or more deformation steps with a deformation ratio for each step that lies in the range 1 to 5, preferably in the range 2 to 5, the deformation ratio satisfying the conventional formula 2 ln(d0/d) where d0 and d are the diameter before and after deformation respectively. The total deformation ratio can lie in the range 1 to 14.

The method can include intermediate annealing steps between the different deformation steps. These intermediate annealings are also carried out for a duration that lies in the range 5 minutes to 2 hours at a temperature that lies in the range 700° C. to 1,500° C. and followed by quenching. Alternatively, these annealings can be followed by slow cooling, that is to say natural cooling, preferably in a vacuum.

The method of the invention preferentially comprises, after the deformation step, a step of eliminating the layer of ductile material. Preferably, the ductile material is eliminated once all deformation operations have been carried out, i.e. after the final rolling operation, before the winding operation. However, this does not rule out removing the layer of ductile material before having finalised all deformation operations. Thus, when rolling in a plurality of stages, the layer of ductile material can be eliminated before the final rolling stage. Preferably, the layer of ductile material, such as copper, is removed from the wire in particular by etching with a cyanide-based or acid-based solution, for example nitric acid.

The final heat treatment after winding is carried out at a temperature that lies in the range 600 to 850° C., preferably in the range 650 to 750° C., for a duration that lies in the range 30 minutes to 80 hours, preferably in the range 30 minutes to 2 hours. A two-phase structure with β-phase Nb and α-phase Zr is obtained at the end of this heat treatment.

The method of the invention allows for the production, and more particularly the shaping, of a balance spring for a balance made of a niobium-zirconium type alloy. This alloy has high mechanical properties, by combining a very high yield strength, greater than 600 MPa, and a very low modulus of elasticity, in the order of 60 GPa to 100 GPa. This combination of properties is well suited to a balance spring. Moreover, such an alloy is paramagnetic.

A binary-type alloy containing niobium and zirconium, of the type selected hereinabove for implementing the invention, also has a similar effect to that of "Elinvar", with a thermoelastic coefficient of virtually zero in the usual operating temperature range for watches, and suitable for the manufacture of self-compensating balance springs.

The invention claimed is:

1. A method for manufacturing a balance spring intended to equip a balance of a horological movement, comprising:
   producing a blank made of a niobium and zirconium alloy containing:
      niobium: the remainder to 100 wt %,
      zirconium: between 10 and 30 wt %,
      impurities, the total percentage whereof lies in the range 0 to 0.5 wt %;
   annealing and cooling the blank;
   depositing a layer of a ductile material on the blank;
   deforming the annealed and cooled blank having the layer of ductile material to form a wire;
   winding the wire to obtain the balance spring; and
   heat treating the balance spring;
   wherein the ductile material is selected from the group consisting of copper, nickel, cupronickel, cupro-manganese, gold, silver, nickel-phosphorus Ni—P and nickel-boron Ni—B,
   a ratio of the area of ductile material to the area of the niobium and zirconium alloy for a given wire cross-section is less than 1, and
   annealing and cooling the blank comprises a dissolving treatment, with a duration that lies in the range 5 minutes to 2 hours at a temperature that lies in the range 700° C. to 1,500° C. in a vacuum, followed by quenching, in a gas or by natural cooling in a vacuum to obtain a supersaturated solid solution of Zr in Nb.

2. The method according to claim 1, further comprising before winding the wire, eliminating said layer of ductile material.

3. The method according to claim 1, wherein deforming the blank comprises wire drawing and/or rolling.

4. The method according to claim 1, wherein
   the deforming the annealed and cooled blank having the layer of ductile material comprises at least two deforming operations, each deforming operation being followed by annealing and cooling of the deformed blank, and
   each deforming operation is performed with a deformation ratio that lies in the range 1 to 5, the total cumulation of the deformations over all of the deforming operations producing a total deformation ratio that lies in the range 1 to 14.

5. The method according to claim 4, wherein each annealing and cooling comprises the dissolving treatment, with a duration that lies in the range 5 minutes to 2 hours at a temperature that lies in the range 700° C. to 1,500° C., in a vacuum, followed by quenching, in a gas or by natural cooling in a vacuum.

6. The method according to claim 1, wherein the heat treatment of the balance spring is carried out for from 30 minutes to 80 hours at a temperature of from 600° C. to 850° C.

7. The method according to claim 1, wherein said ratio is less than 0.5.

8. The method according to claim 1, wherein said ratio lies in a range 0.01 to 0.4.

* * * * *